Figure 1:
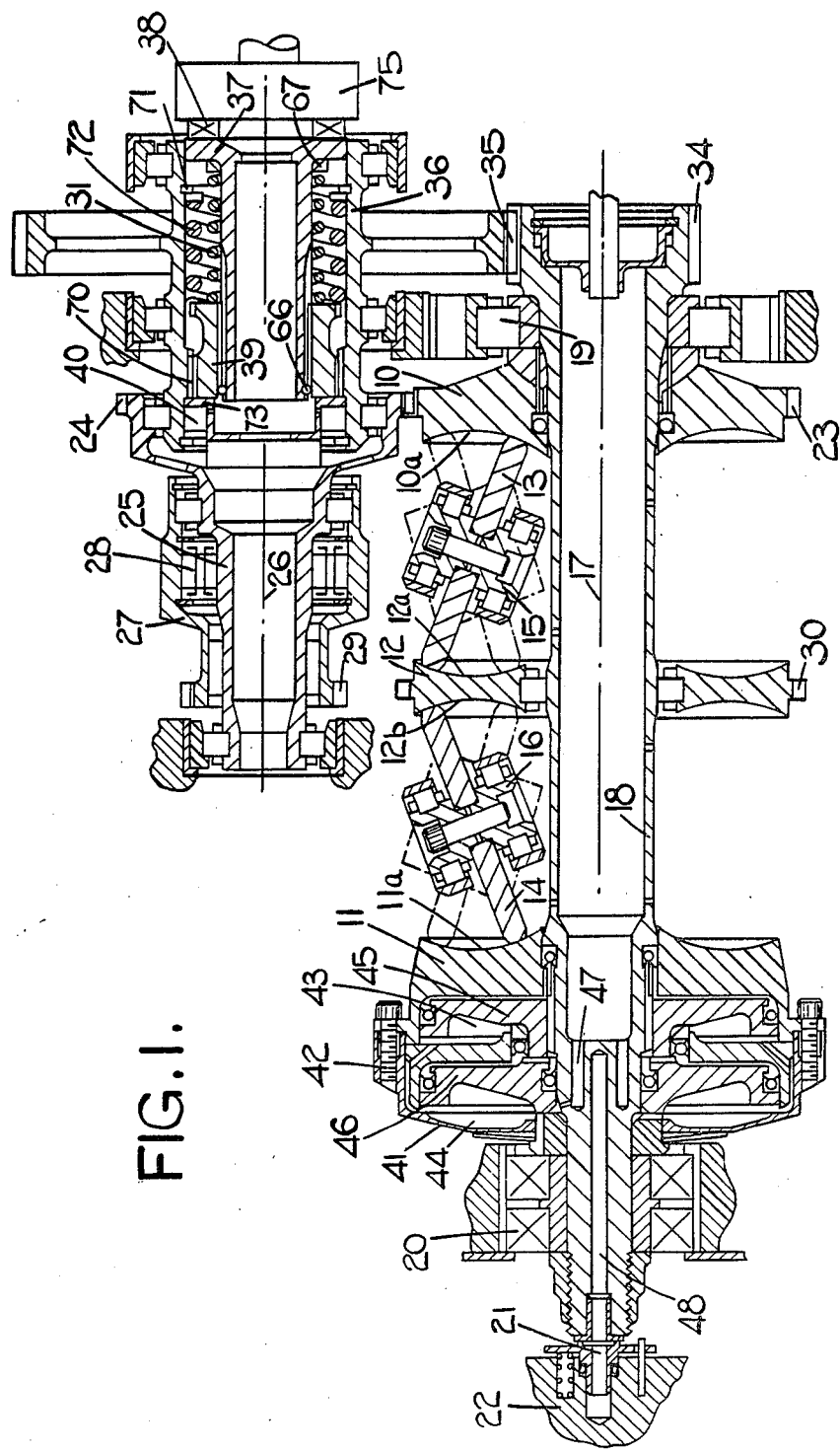

United States Patent [19]

Sharpe et al.

[11] 4,385,894
[45] May 31, 1983

[54] COUPLINGS

[75] Inventors: Raymond Sharpe, Mirfield; Trevor J. Griffiths, Bradford; Peter Hunt, Shipley, all of England

[73] Assignee: Lucas Industries Limited, Great Britain

[21] Appl. No.: 119,444

[22] Filed: Feb. 7, 1980

Related U.S. Application Data

[63] Continuation-in-part of Ser. No. 824,248, Aug. 12, 1977, abandoned.

[51] Int. Cl.³ .............................................. F16D 11/00
[52] U.S. Cl. ........................................ 464/31; 464/39; 464/147; 192/82 T
[58] Field of Search .................. 64/9 R, 28 R, 29; 192/82 T; 464/31, 39, 147

[56] References Cited

U.S. PATENT DOCUMENTS

| | | | |
|---|---|---|---|
| 2,193,068 | 7/1965 | Greve et al. | 64/28 R |
| 2,983,122 | 5/1961 | Polzin | 64/29 |
| 3,675,444 | 7/1972 | Whipple | 64/28 R |
| 3,889,789 | 6/1975 | Boehringer | 64/28 R |
| 4,086,991 | 5/1978 | Swadley | 64/28 R |

FOREIGN PATENT DOCUMENTS

| | | | |
|---|---|---|---|
| 1151766 | 2/1958 | France | 64/9 R |
| 2339790 | 8/1977 | France | 64/9 R |

Primary Examiner—Parshotam S. Lall
Attorney, Agent, or Firm—Kane, Dalsimer, Kane, Sullivan and Kurucz

[57] ABSTRACT

A coupling for use in a transmission system and between rotary members which are arranged for driving engagement through axially engaging teeth thereon, the teeth being shaped to tend to disengage when normally driving in one direction, one of said members having two components connected by helical splines, the components being prevented from moving axially to disengage the teeth by a fusible element which will melt when temperature rises above a predetermined value, melting of said element permitting movement of the components axially to disengage the teeth and the helical splines permitting axial relative movement between the two components, when reverse rotation is taking place, to permit ratcheting of the teeth.

5 Claims, 3 Drawing Figures

COUPLINGS

This is a continuation-in-part application of application Ser. No. 824,248 filed Aug. 12, 1977, now abandoned.

This invention relates to couplings for rotary members permitting drive to take place in one direction but allowing the members to rotate relatively to one another in the opposite direction, without engagement between them and without interference in the event of malfunctioning.

One example of a coupling of the kind with which the invention is concerned is in a variable ratio frictional drive gear of the kind comprising basically two axially spaced torus discs or rotors, one serving as an input and the other an output between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus varying the drive ratio of the gear. The angle of tilt of the roller bearing structure as it controls the drive ratio of the gear, is called the ratio angle. The input however is protected by a coupling designed to permit rotation between the input and a member by which it is normally driven, the coupling being arranged to permit such rotation in the event of malfunctioning.

This is of particular use when the system is run at very high rotational speeds, perhaps up to 20,000 revolutions per minute.

Since such a system runs at high speeds and operating conditions are therefore arduous, it is desirable to provide some protection against malfunctioning.

It is therefore the object of the invention to provide a coupling in which protection against malfunctioning, leading to excessive temperature rise, is afforded in an effective form, in which the re-engagement of the coupling is prevented when said excessive temperature conditions have been reached.

It is also an object to allow ratcheting between interengaging teeth of parts of the coupling when rotation in a reverse direction occurs.

Figure 2:
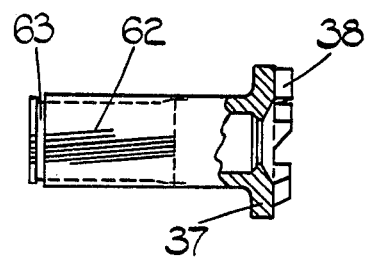
Figure 3:
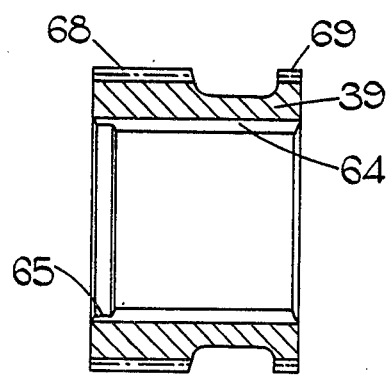

The invention will now be described, by way of example, with reference to the accompanying drawings, in which:

FIG. 1 is a cross-sectional view showing a transmission system incorporating the invention, FIG. 2 is an enlarged view of one component of a coupling in the input of the system, and FIG. 3 is a view, but on the scale of FIG. 1, of another component of the coupling.

The transmission system is principally designed for use in driving aircraft accessories and in particular an alternator. The alternator is driven from an aircraft main engine but is required to be rotated at constant speed. The transmission is therefore designed for variable input speed, but constant output speed. It is, however, to be understood that transmission incorporating the invention as herein defined can be used in transmission of this sort with other operating characteristics including constant input and variable output speed and variable input as well as output speeds.

Referring first to FIG. 1, the general layout of the transmission is illustrated. The system includes a variable ratio drive unit having three rotors 10, 11, 12 which have respective part toroidal surfaces 10a, 11a and 12a and 12b respectively. The rotor 12, is situated midway between the rotors 10 and 11, and is provided with its part toroidal surfaces 12a, 12b on opposite axially presented sides thereof. The rotor 10 has its part toroidal surface 10a presented towards the surface 12a, and similar the surface 11a of the rotor 11 is presented towards the surface 12b of the central rotor 12. The rotors 10, 11 are input rotors and the rotor 12 is an output rotor. However, the system will operate perfectly satisfactorily with the rotors 10, 11 as output and the input is the rotor 12. Situated between the rotors 10, 12 and 11, 12 are respective sets of flat rollers 13, 14. These are rotatable in a manner which will be described and are for this purpose carried in respective bearings 15, 16. The rollers are shown in FIG. 1 in position in which they engage the respective surfaces 10a, 12a and 11a, 12b at different distances from the axis of rotation of the rotors 10, 11, 12. Such axis is identified at 17. The rotors 10, 11 are carried non-rotatably upon a hollow shaft 18. This is supported on suitable fixed structure 22 by means of bearings 19, 20 situated near its opposite ends respectively.

To load the rotors 10, 11, 12 and the rollers 13, 14 so as to maintain frictional contact between them, there is an end load device within a housing 41 secured by screws 42 to the rotor 11 at the side thereof remote from its part toroidal surface 11a.

Defined within the space between the rotor 11 and the housing 41 are cavities 43, 44 for hydraulic fluid. Within the cavities are respective pistons 45, 46 mounted on the shaft 18. In the end of the shaft 18 is a rotary fluid joint 21 engaged in the fixed structure 22.

Furthermore, in this end of the shaft 18 are drillings 47, 48 for supply and exhaust of fluid to the cavities 43, 44. The passage 48 communicates with the joint 21 for supplying high pressure fluid fed at one side of each of the pistons 45 and 46. At the other side of the pistons 45 and 46, lower fluid pressure is fed from one of the two drillings 47 which are symmetrical for balance of the sheet.

In operation of this transmission system, with variable speed input and constant output to the drive, there is automatic compensation for input speed change and this is achieved through the alteration in the castor angle of the rollers. The inclination of the rollers as seen in FIG. 1, regulates the ratio of the speed of the input rotors 10, 11 to the speed of the output rotor 12. As illustrated in full lines rotation of the input rotors 10, 11 at a given speed will cause rotation of the output rotor 12 at a slower speed than said given speed. As indicated in dotted lines, the opposite ratio characteristic can be achieved if the point of contact between the rollers on the input rotors 10, 11 is outside that on the surfaces 12a, 12b of the output rotor 12. If, however, the rollers engage the surfaces 10a, 11a, 11a and 12b at the same radial distance on each such surface from the axis 17 of the shaft 18, the input and output rotors 10, 11, 12 will all rotate at the same speed. This represents a drive ratio of 1:1 between the input and the output of the system.

The input rotor 10 has on its external periphery, gear teeth 23 engaging with a gear ring 24 on a hollow stepped shaft 25. This hollow stepped shaft is mounted for rotation about an axis 26, parallel with the axis 17. Connecting the hollow stepped shaft 25, with a surrounding sleeve 27, is a clutch 28. The sleeve 27 has gear teeth 29 meshing with a gear (not shown) which drives auxiliary equipment which forms no part of this invention.

The output rotor 12 has external gear teeth 30 and this represents the output of the drive unit.

A coupling is incorporated for driving the transmission system. This includes a member which is shown as a part 75, connected, in use, to apparatus driving the transmission, such as an internal combustion engine.

The coupling has a further member which includes two components, a shaft 37 and a sleeve 39. Surrounding the shaft 37 and sleeve 39 is a hollow sleeve 36 which carries a gear wheel 35. This is in mesh with a gear 34 on the shaft 18.

The sleeve 36 is mounted in bearings in the fixed structure 22 and is coaxial with the shaft 37 and sleeve 39, which are accommodated within it. The part 75 and the shaft 37 have meshing axially presented teeth at 38. As shown in FIG. 2 these teeth each have a steeper face which is inclined to the axis at a small angle. When such faces are in engagement for rotation, there is thus generated a force tending to disengage the teeth. However, such disengagement is normally resisted, as will be described. FIG. 2 shows the shaft 37 and FIG. 3 the sleeve 39 which is shown on an enlarged scale.

An element 40 is arranged to melt and allow the shaft 37 to move axially in a direction to disengage the teeth. A coiled compression spring 72, in that event assists this movement but is primarily to prevent reengagement of the teeth. If the system reaches a temperature in excess of a predetermined value, this element melts and thus disconnects the input drive from the transmission system.

The shaft 37 has an externally helically splined surface 62 and at its end remote from the teeth 38, an annular external groove 63. The teeth 38 are moreover of the shape each having a more shallowly inclined rear face so that they can ratchet against the correspondingly shaped teeth on the part 75. Such ratcheting occurs if the input direction is reversed, for example, when the associated engine which is driving the apparatus, windmills in reverse direction from the normal driving direction.

The sleeve 39 has internal helical splines at 64 complementary to the splines on the shaft 37. The splines are of relatively shallow angle with respect to the common axis of the components 37, 39. The end of the sleeve 39 moreover has an internal step 65. Located in the groove 63 in the shaft 37 is a stop ring 66. When the sleeve 39 is urged towards this, as it is when running in the normal direction, the stop ring 66 limits axial movement of the said sleeve 39 along the shaft 37 in the direction away from the teeth at 38. Such tendency for movement of the sleeve 39 is created by the helical splines which connect it with the shaft 37. The forces between the splines surfaces 62, 64 due to the shallow helix angle, and that due to the shapes of the driving faces of the teeth 38, are reacted against the element 40 so that no axial movement occurs in normal driving conditions. The element 40 is located against a circlip in the interior of the sleeve 36 which thus normally provides the reaction against which the forces mentioned act. Two coiled compression springs 31 and 72 surround the shaft 37 and bear on the end of the sleeve 39. The inner one of these springs 31 acts against a flange of the shaft 37 on which the teeth 38 are formed.

The sleeve 39 has two external aligned but axially spaced straight splined portions 68, 69 on the former such portion engaging corresponding splines 70 in the interior surface of the sleeve 36. Also within this sleeve 36 and spaced from the spline 70 therein is a groove containing a circlip 71 acting as an abutment against which the outer larger coiled compression spring 72 passes.

The element 40 is made from solder in the form of a ring and will melt at the predetermined temperature. It is backed by a support ring 73 of flanged cup shape.

If the element 40 melts, during normal running, in said one direction, the ring 73, sleeve 39 and shaft 37 move together in a direction to disengage the teeth 38 from those of the associated part 75 of the driving apparatus, thus preventing damage to the input and to the drive unit resulting from the temperature rise. The forces mentioned, created between the driving faces of the teeth cause such disconnection. This is assisted by the spring 72, though this is provided primarily to ensure that the teeth cannot re-engage after such disconnection. In such condition the teeth must be completely separated and must remain so.

If the ratcheting effect is taking place when reverse rotation is taking place, that is without melting of the element 40, the helical splines 62, 64 will allow the shaft 37 to move lengthwise of its axis through the sleeve 39. The helical spline inclination tends to assist ratcheting when reverse rotation occurs. The inner spring 31 is provided to return the teeth into mesh as ratcheting occurs.

We claim:

1. A coupling between two rotary element's axially interengaging teeth of said elements arranged for driving engagement between said elements, each of said teeth of both of the elements having at least one face inclined at an angle to apply, during driving engagement between said teeth faces, a force tending to disengage said teeth, one of said elements including two coaxial components, helical splines between said two components, one of the components having said axial teeth thereon, said helical splines applying in use, when rotation takes place in the direction of such tooth face engagement, a force tending to move said other one of said components in an axial direction away from said teeth, stop means for limiting relative axial movement between said two components, an element sensitive to temperature rise arranged to restrain said tendency for disengagement of said teeth, temperature rise in excess of a predetermined value resulting in said two components being moved axially to disengage the teeth, rotation in the opposite direction causing the two components to move relatively in axial direction, through said helical splines, to allow ratcheting of the teeth, and spring means arranged to hold the said components in a position to prevent re-engagement of the teeth when the temperature sensitive element has melted.

2. A coupling as claimed in claim 1 wherein further spring means acts between said two components to urge them towards a position in which said stop means limits relative axial movement.

3. A coupling as claimed in claim 1 wherein a sleeve surrounding said two components has a portion against which the temperature sensitive element is located, and when rotation in said one direction takes place, the force generated between said tooth faces is reacted through said element onto said portion of the sleeve, and straight interengaging splines on said sleeve and said other one of the components.

4. A coupling as claimed in claim 1 in which the helical splines are of shallow angle with respect to the common axis of the components to permit relative axial movement between the two components to allow ratcheting of the teeth.

5. A coupling as in claim 1 further comprising a first sleeve in which said sleeve is disposed, wherein said spring means applies a force between said first sleeve and said one element.

* * * * *

UNITED STATES PATENT AND TRADEMARK OFFICE
CERTIFICATE OF CORRECTION

PATENT NO. : 4,385,894
DATED : May 31, 1983
INVENTOR(S) : Raymond Sharpe et al

It is certified that error appears in the above-identified patent and that said Letters Patent is hereby corrected as shown below:

On the title page add:

-- [30] Foreign Application Priority Data

August 14, 1976  [GB]  United Kingdom........33909/76

August 14, 1976  [GB]  United Kingdom........26769/77 --.

Signed and Sealed this

First Day of May 1984

[SEAL]

Attest:

GERALD J. MOSSINGHOFF

Attesting Officer  Commissioner of Patents and Trademarks